(12) United States Patent
Yoo

(10) Patent No.: US 11,572,093 B2
(45) Date of Patent: Feb. 7, 2023

(54) STROLLER

(71) Applicant: Sang Jin Yoo, Seoul (KR)

(72) Inventor: Sang Jin Yoo, Seoul (KR)

( * ) Notice: Subject to any disclaimer, the term of this patent is extended or adjusted under 35 U.S.C. 154(b) by 358 days.

(21) Appl. No.: 16/977,669

(22) PCT Filed: Apr. 12, 2019

(86) PCT No.: PCT/KR2019/004407
§ 371 (c)(1),
(2) Date: Sep. 2, 2020

(87) PCT Pub. No.: WO2019/203505
PCT Pub. Date: Oct. 24, 2019

(65) Prior Publication Data
US 2020/0391782 A1    Dec. 17, 2020

(30) Foreign Application Priority Data

Apr. 18, 2018  (KR) .......................... 10-2018-0045163

(51) Int. Cl.
*B62B 7/14*   (2006.01)
*B62K 13/00*  (2006.01)
(Continued)

(52) U.S. Cl.
CPC ................ *B62B 7/12* (2013.01); *B62B 7/042* (2013.01); *B62B 7/044* (2013.01); *B62B 7/14* (2013.01); *B62K 13/00* (2013.01); *B62K 9/02* (2013.01)

(58) Field of Classification Search
CPC ........... B62B 7/12; B62B 7/042; B62B 7/044; B62B 7/14; B62K 9/02; B62K 13/00; B62K 15/00; B62K 2206/006; B60G 21/04
See application file for complete search history.

(56) References Cited

U.S. PATENT DOCUMENTS

| 4,953,880 | A | * | 9/1990 | Sudakoff ................. B62B 7/06 280/47.38 |
| 6,601,862 | B2 | | 8/2003 | Kettler |

(Continued)

FOREIGN PATENT DOCUMENTS

| CN | 106114724 A | * | 11/2016 | ............... B62B 9/08 |
| CN | 106114724 A |   | 11/2016 |  |

(Continued)

*Primary Examiner* — Steve Clemmons
(74) *Attorney, Agent, or Firm* — Korus Patent, LLC; Seong Il Jeong

(57) ABSTRACT

The present invention relates to a stroller, and provides a stroller including: a seat part, and a seat accommodation part configured to accommodate a seat; a connection frame part including a first connection frame configured to support the seat and to include vertical portions and lateral portions, and a second connection frame formed in a "U" shape including vertical portions and a lateral portion and configured such that the vertical portions are rotatably connected to the first connection frame; and a bicycle structure including a main frame configured such that the connection frame part is mounted thereon in such a manner that the first connection frame is coupled to the front end thereof and the second connection frame is coupled to the rear end thereof, a front wheel installed under the front of the main frame, and rear wheels installed under the back of the main frame.

12 Claims, 10 Drawing Sheets

(51) Int. Cl.
*B62B 7/12* (2006.01)
*B62B 7/04* (2006.01)
*B62K 9/02* (2006.01)

(56) References Cited

U.S. PATENT DOCUMENTS

| | | | |
|---|---|---|---|
| 9,321,499 B2 * | 4/2016 | Kim | ................ B62K 9/00 |
| 9,789,893 B2 * | 10/2017 | Young | ................ B62K 13/04 |
| 11,161,539 B2 * | 11/2021 | Day | ................ B62B 7/12 |

FOREIGN PATENT DOCUMENTS

| | | | | |
|---|---|---|---|---|
| ES | 2289849 A1 * | 2/2008 | | ............ B62B 7/12 |
| KR | 10-1999-0030344 A | 4/1999 | | |
| KR | 20-0413288 B2 | 4/2006 | | |
| KR | 200413288 Y1 * | 4/2006 | | |
| KR | 10-2009-0091548 Y1 | 8/2009 | | |
| KR | 20090091548 A * | 8/2009 | | |
| KR | 10-2009-0100870 A | 9/2009 | | |
| KR | 20090100870 A * | 9/2009 | | |
| KR | 10-2009-0129335 A | 12/2009 | | |
| KR | 20160114440 A * | 10/2016 | | |
| KR | 10-2017-0019735 A | 2/2017 | | |
| KR | 10-2017-0034625 A | 3/2017 | | |
| KR | 10-2018-0004630 A | 1/2018 | | |
| WO | 2004/067352 A1 | 8/2004 | | |

* cited by examiner

STROLLER

TECHNICAL FIELD

The present invention relates generally to a stroller, and more particularly to a stroller that can be changed to and used as a stroller or a bicycle as necessary by coupling or separating a connection frame part, to which a seat part is coupled, to or from the front and rear sides of the main frame of a bicycle structure.

BACKGROUND ART

Generally, the age span for the use of strollers ranges from the age of a newborn baby to 3 years old.

However, compared to such a short period of use, the purchase price of a stroller is considerably high. In particular, in the case of an infant having a rapid growth rate, the period is shorter due to rapid growth, and there are many cases that the stroller becomes useless.

Furthermore, in these days in which the average number of children per household is less than one, it is a reality that it has become uncommon to use such an expensive stroller between brothers or sisters.

However, conventional strollers are mainly improved only in functional parts, as in the case where the strollers are fabricated to be foldable for convenient storage or only the designs of the strollers are changed.

Furthermore, consumers tend to purchase and use strollers having a low price rather than paying high costs for strollers having a short period of use. The reality is that consumers ignore the safety of strollers and think about the costs thereof first.

Moreover, as the periods of use of the strollers are shortened, the strollers are not discarded due to a breakdown or the like, but most of the strollers are discarded after the ages for the use of the strollers even when they are almost new. Therefore, problems arise in that serious waste of resources and environmental pollution are caused by such discarded or unused strollers.

PRIOR ART DOCUMENT

Patent Document (Patent document 1) Korean Patent Application Publication No. 2009-0129335 (published on Dec. 16, 2009)

DISCLOSURE

Technical Problem

Therefore, the present invention has been conceived to overcome the above-described problems, and an object of the present invention is to provide a stroller that can be changed to and used as a stroller or a bicycle as necessary by coupling or separating a connection frame part, to which a seat part is coupled, to or from the front and rear sides of the main frame of a bicycle structure.

Another object of the present invention is to provide a stroller that can change and use a bicycle structure to and as a two-wheeled bicycle or a three-wheeled bicycle as necessary.

Technical Solution

In order to accomplish the above objects, the present invention provides a stroller including: a seat part including a seat, and a seat accommodation part configured to accommodate the seat; a connection frame part including a first connection frame configured to support the seat on both sides thereof and to include vertical portions and lateral portions, and a second connection frame formed in a "U" shape including vertical portions and a lateral portion and configured such that the vertical portions are rotatably connected to the first connection frame; and a bicycle structure including a main frame configured such that the connection frame part is mounted thereon in such a manner that the first connection frame is coupled to the front end thereof and the second connection frame is coupled to the rear end thereof and such that a saddle is installable thereon, a front wheel installed under the front of the main frame, and rear wheels installed under the back of the main frame.

According to an embodiment of the invention, protrusion portions extending downward may be installed on both sides of the seat accommodation part, fastening portions having fastening grooves configured to receive the protrusion portions may be installed on the vertical portions of the first connection frame corresponding to the protrusion portions, and the seat accommodation part may be formed to be selectively attached to and detached from the connection frame part.

According to an embodiment of the invention, the front wheel may be installed under the front of the main frame, and may be formed to be steered and rotated by a support fork configured to support a front axle; and the rear wheels may be installed under the back of the main frame, and may be formed to be rotated by the coupling between first ends of a pair of rear wheel connection frames configured to support rear axles, respectively, and a pair of fastening frames connected to the main frame.

According to an embodiment of the invention, first ends of the fastening frames may be rotatably connected to the main frame by hinges; second ends of the fastening frames may extend downward from both left and right sides of the main frame and be fastened to first ends of rear wheel connection frames at corresponding locations; and a fastening shaft may be connected between the axes that are shared when the fastening frames and the rear wheel connection frames are coupled to each other.

According to an embodiment of the invention, a coupling means, including a coupling portion vertically fastened to the fastening shaft, detachably coupled to a rear end of the main frame and configured to have a hollow, and a fastening bar configured to be inserted into the hollow of the coupling portion, to fasten the second connection frame of the connection frame part and to have a separate grip portion, is installed in the main frame.

According to an embodiment of the invention, the coupling portion may include: a sideways "U" shaped coupling element provided at the rear end of the main frame; and an attachment portion integrated with the upper end of the coupling portion, and configured to be selectively coupled to and separated from the coupling element by the rotation of the fastening shaft.

According to an embodiment of the invention, the coupling portion may include two or more tubes having different sizes that are sequentially inserted and fastened such that a length of the coupling portion is adjustable.

According to an embodiment of the invention, a coupling member configured to be rotatably coupled to the front end of the main frame of the bicycle structure may be installed on the lateral portion located at the lower end of the first connection frame; and a through hole configured to allow the fastening bar to be inserted into the rear end of the main frame of the bicycle structure and to be fastened to a coupling portion may be formed in the lateral portion of the second connection frame.

According to an embodiment of the invention, the coupling member may be formed in a hollow tube shape that is rotatably installed on the lateral portion of the first connection frame, and a protrusion portion configured to be inserted and fastened into a groove portion formed at the front end of the main frame may be integrated with the coupling member.

According to an embodiment of the invention, the bicycle structure may constitute a three-wheeled bicycle, including: a front wheel installed under the front of the main frame, and formed to be steered and rotated by a support fork configured to support a front axle; and a pair of rear wheels installed under the back of the main frame, and formed to be rotated by coupling between first ends of a pair of rear wheel connection frames configured to support rear axles, respectively, and a pair of fastening frames connected to the main frame.

According to an embodiment of the invention, a coupling portion vertically fastened to a fastening shaft formed between the axes that are shared when the fastening frames and the rear wheel connection frames are coupled to each other, detachably coupled to a rear end of the main frame, and configured to have a hollow and a fastening bar configured to be inserted into the hollow of the coupling portion, to fasten the second connection frame of the connection frame part and to have a separate grip portion may be installed.

According to an embodiment of the invention the bicycle structure may constitute a two-wheeled bicycle, including: a front wheel installed under the front of the main frame, and formed to be steered and rotated by a support fork configured to support a front axle; and a rear wheel installed under the back of the main frame, configured to be supported on both the left and right sides in parallel by rear wheel fastening frames cross-coupled between the fastening frames configured such that the first ends thereof are connected to the main frame by the hinges and the second ends thereof extend downward from both the left and right sides of the main frame, and formed to be rotated.

Advantageous Effects

According to the present invention configured as described above, the stroller can be changed to and used as a stroller or a bicycle as necessary by coupling or separating a connection frame part, to which a seat part is coupled, to or from the front and rear sides of the main frame of a bicycle structure, thereby providing convenience in use.

In particular, when an infant who used the stroller grows up and needs a bicycle, the stroller can be changed to a three-wheeled or two-wheeled bicycle without discarding the stroller, thereby promoting resource conservation and reducing environmental pollution.

BEST MODE

The present invention may be subjected to various changes, and may have various forms. Embodiments will be described in detail in the text. However, this is not intended to limit the present invention to specific forms of disclosure, and it should be understood that the present invention includes all changes, equivalents, and substitutes included in the spirit and scope of the present invention. In the following description of the individual drawings, like reference symbols have been used for like components.

The terms used herein are each used only for the purpose of distinguishing one component from another component. The terms used herein are used merely to describe specific embodiments, and are not intended to limit the present invention. Singular expressions include plural expressions unless the context clearly indicates otherwise.

Embodiments of the present invention will be described in detail below with reference to the accompanying drawings.

Figure 1:
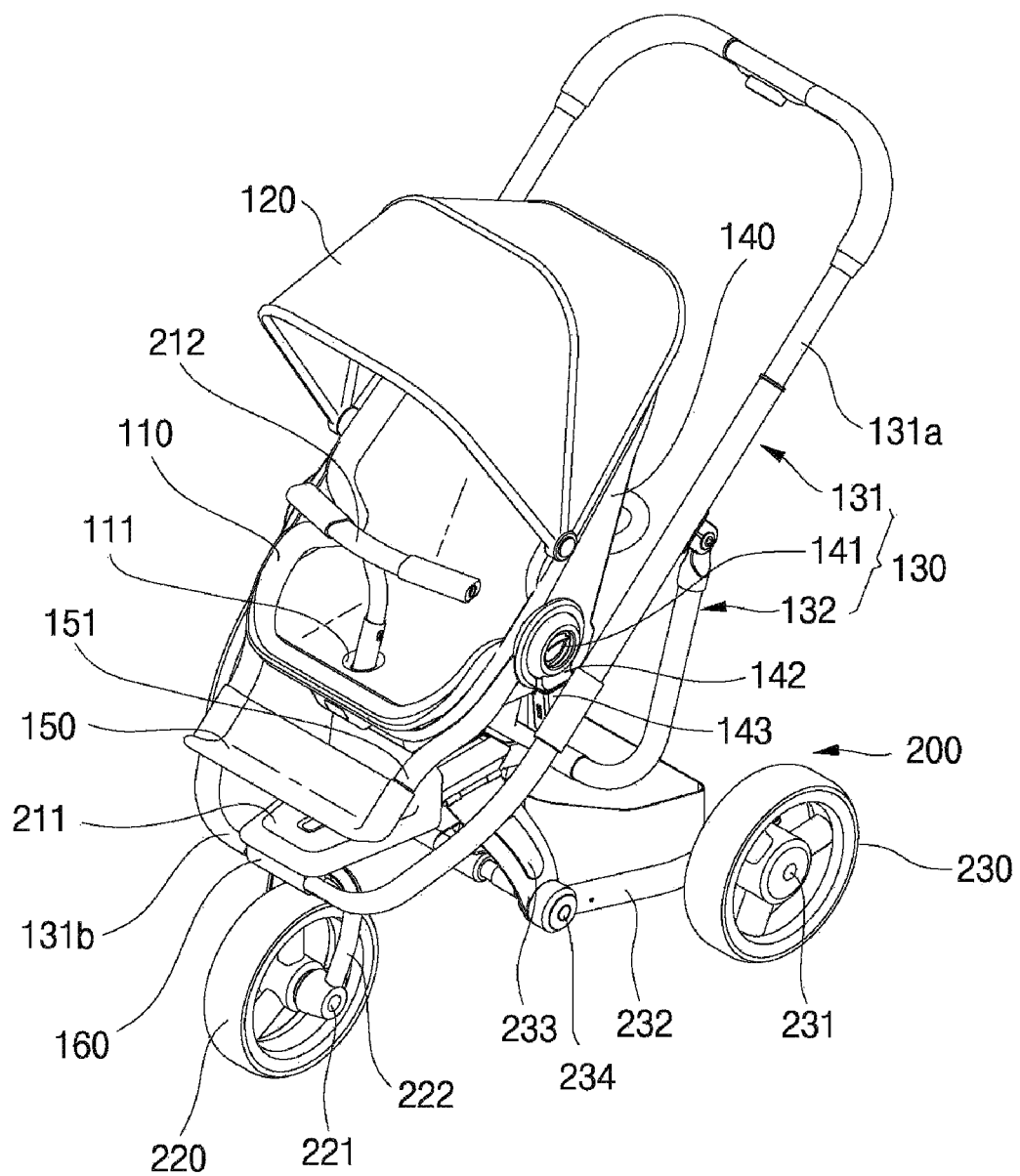
FIG. 1 is a perspective view showing a stroller according to the present invention.
Figure 2:
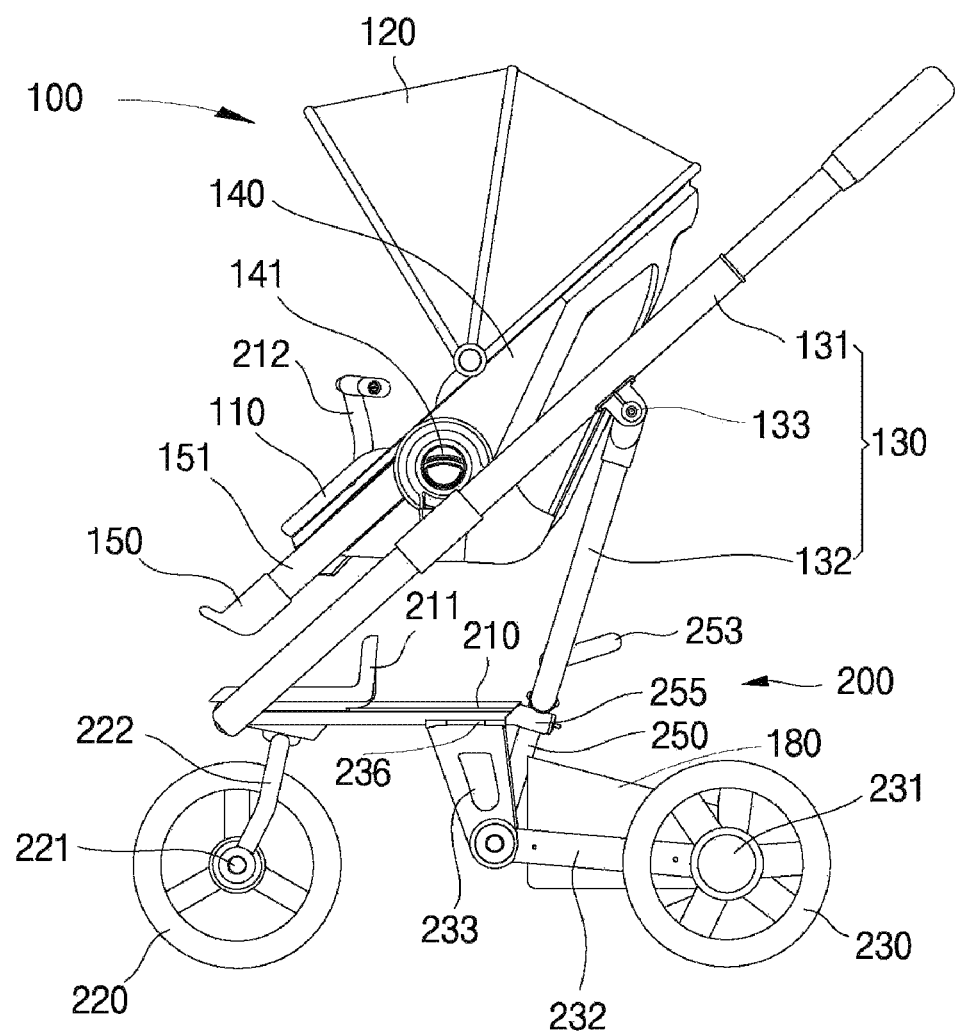
FIG. 2 is a front view showing the stroller according to the present invention.
Figure 3:
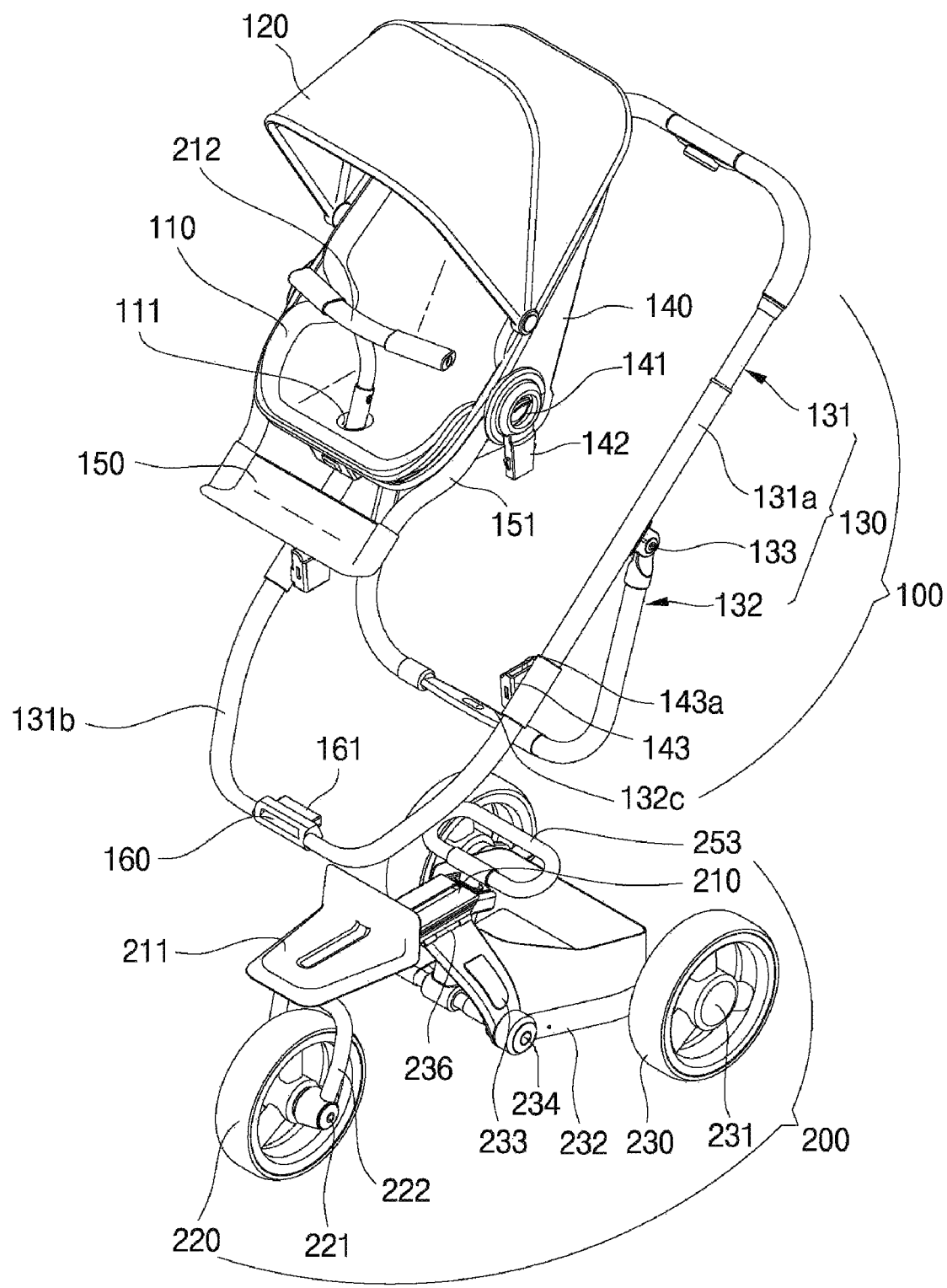
FIG. 3 is an exploded perspective view showing a seat part, a connection frame part, and a bicycle structure according to the present invention.
Figure 4:
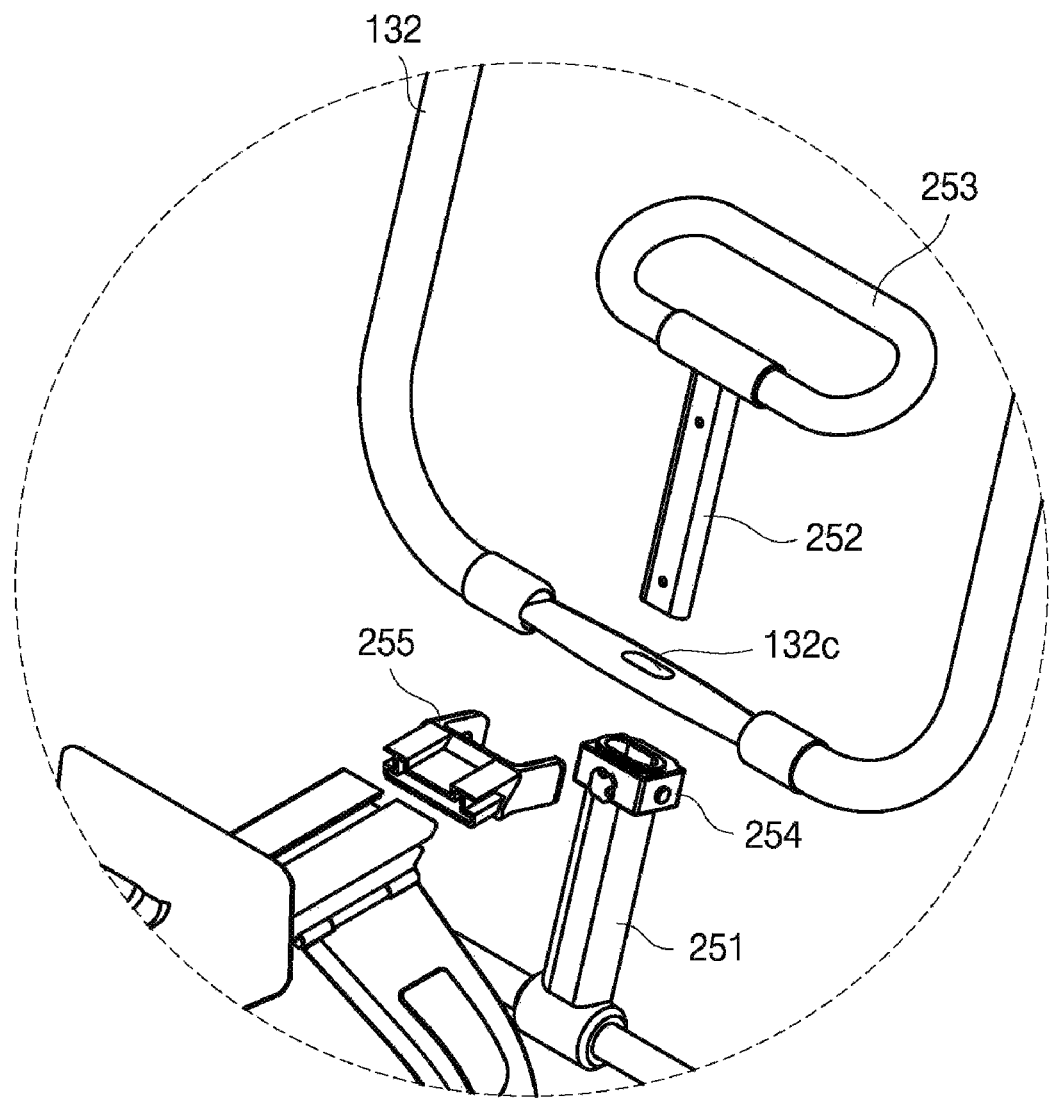
FIG. 4 is a perspective view showing a coupling structure between the second connection frame of the connection frame part and the rear end of the bicycle structure according to the present invention.
Figure 5:
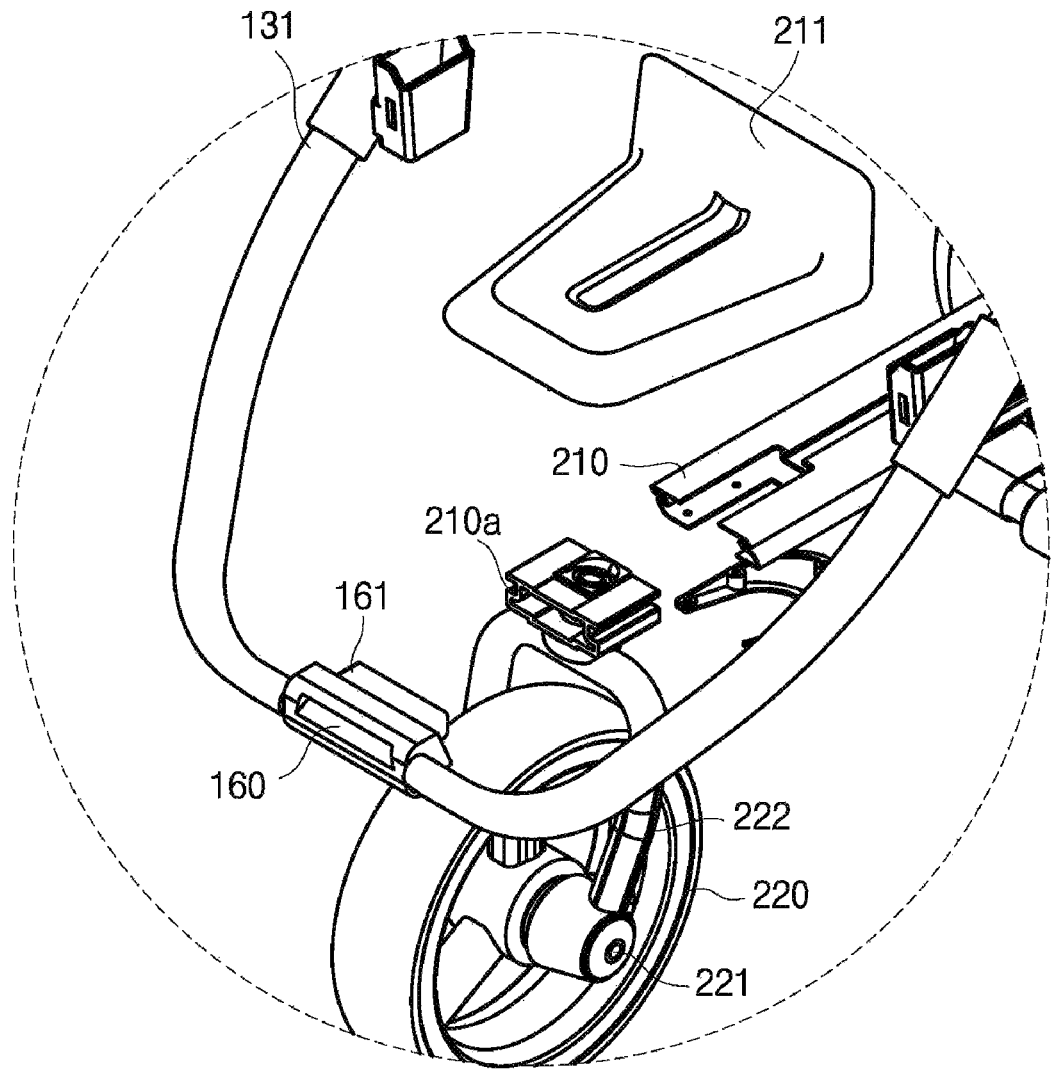
FIG. 5 is a perspective view showing a coupling structure between the first connection frame of the connection frame part and the front end of the bicycle structure according to the present invention.

Accompanying FIG. 1 is a perspective view showing a stroller according to the present invention, and FIG. 2 is a front surface showing the stroller according to the present invention. Furthermore, FIG. 3 is an exploded perspective view showing a seat part, a connection frame part, and a bicycle structure according to the present invention, FIG. 4 is a perspective view showing a coupling structure between the second connection frame of the connection frame part and the rear end of the bicycle structure according to the present invention, and FIG. 5 is a perspective view showing a coupling structure between the first connection frame of the connection frame part and the front end of the bicycle structure according to the present invention.

Figure 6:
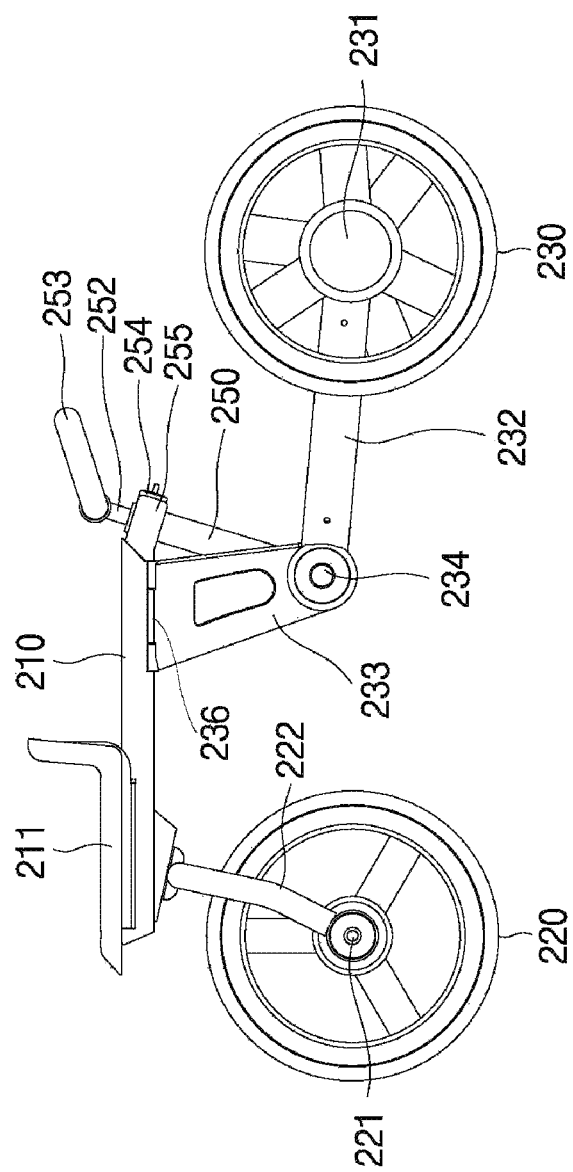
FIG. 6 is a front view showing the bicycle structure of the stroller according to the present invention.
Figure 7:
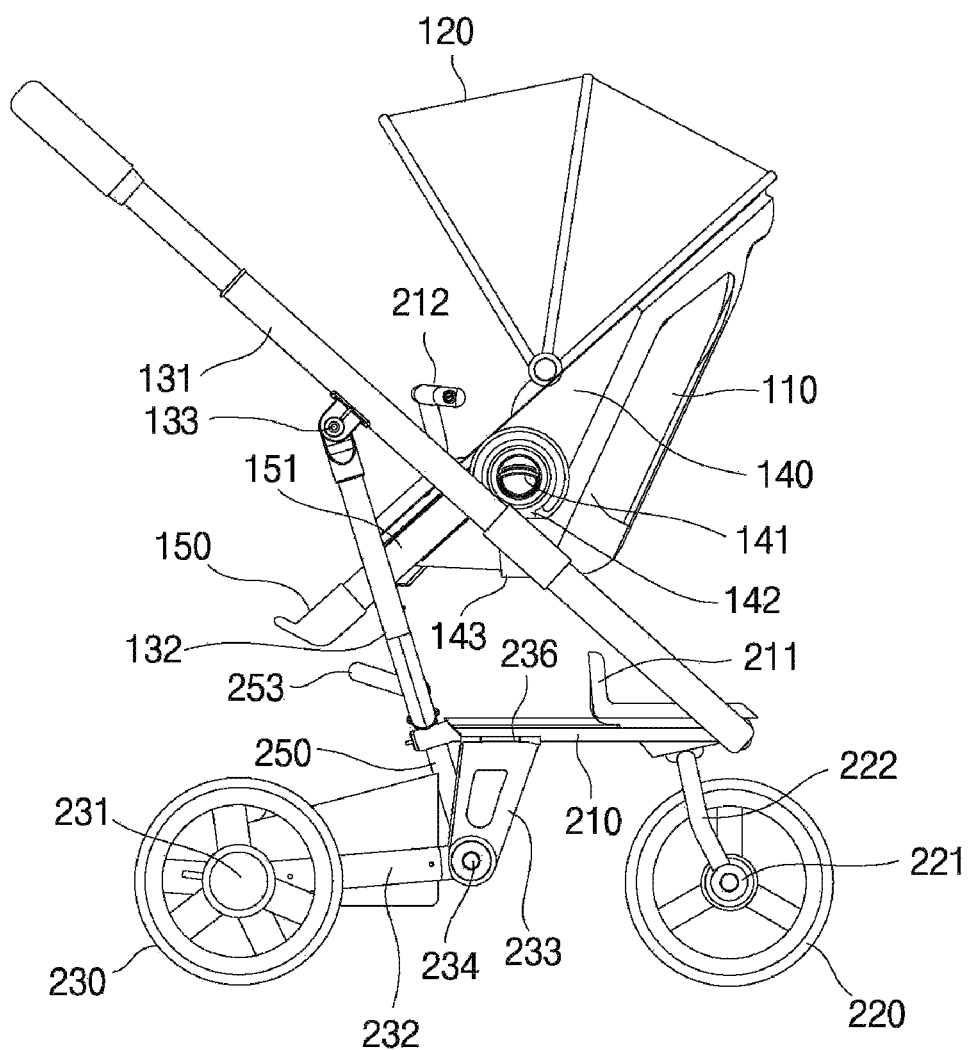
FIG. 7 is a view showing a state in which the front of the seat part of the stroller according to the present invention is installed to be directed rearward.
Figure 8:
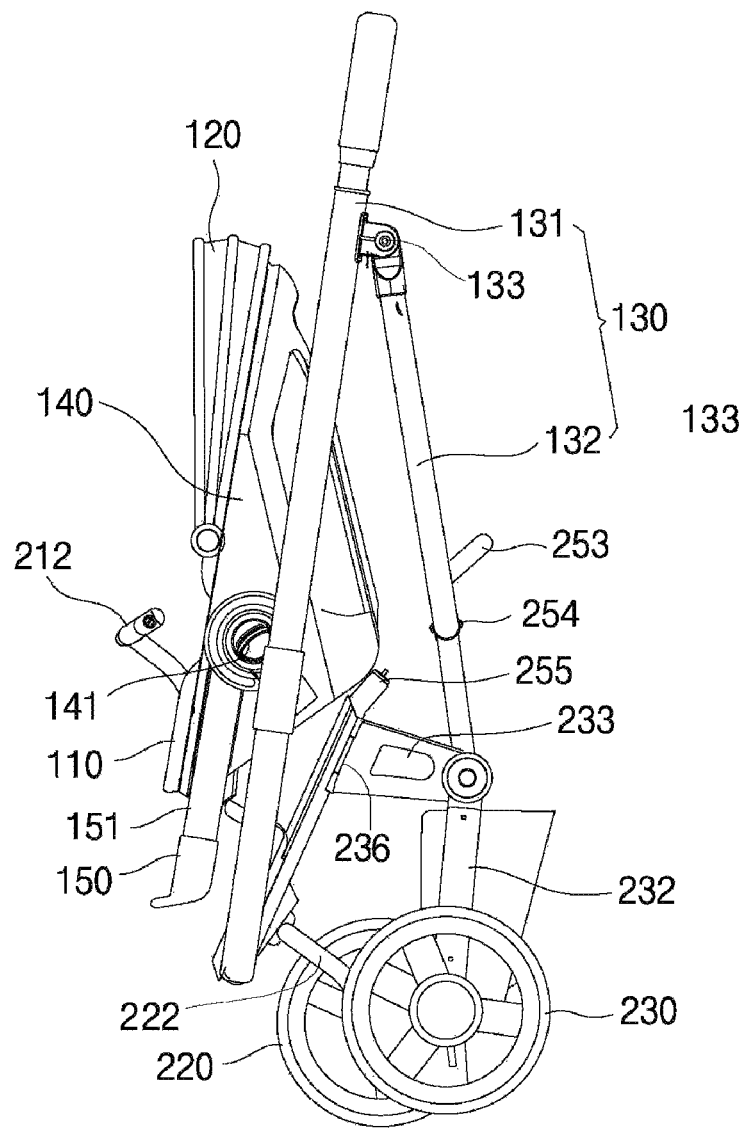
FIG. 8 is a front view showing the folded state of the stroller according to the present invention.

FIG. 6 is a front view showing the bicycle structure of the stroller according to the present invention, FIG. 7 is a view showing a state in which the front of the seat part of the stroller according to the present invention is installed to be directed rearward, and FIG. 8 is a front view showing the folded state of the stroller according to the present invention.

As shown in FIGS. 1 and 2, the stroller according to the present invention includes a seat part 100, a connection frame part 130, and a bicycle structure 200.

In this case, the seat part 100 includes a seat 110 made of fabric material and configured to allow an infant to be seated thereon, a shade part 120 detachably attached over the seat 110 and configured to block sunlight, and a seat accommodation part 140 made of hard plastic material and configured to accommodate the seat 110.

Rotation parts 141 configured to adjust the angle of the seat 110 are disposed on both left and right sides of the seat accommodation part 140. Furthermore, there is disposed a footrest 150 that is fastened by connection bars 151 connected to the rotation part 141. The angle of the footrest 150 is also adjusted by the rotation parts 141.

Furthermore, an insertion hole 111 is formed in the top surface of the front of the seat 110, and the handle 212 of a bicycle configured to allow an infant to hold it is detachably installed in the insertion hole 111.

The connection frame part 130 is connected to the bicycle structure 200 to stably mount the seat part 100 on the bicycle structure 200.

The connection frame part 130 includes a first connection frame 131 configured to support the seat part 100 on both sides thereof and to include vertical portions 131a and lateral portions 131b, and a second connection frame 132 formed in a "U" shape including vertical portions 132a and a lateral portion 132b, and configured such that the vertical portions 132a are connected to rotatable connection shafts 133 provided on both sides of the first connection frame 131 and a through hole 132c configured to receive the fastening bar 252 of a coupling means 250 is formed in the lateral portion 132b.

The connection frame part 130 configured as described above may be fastened to the bicycle structure 200 with the seat 110 coupled thereto.

As shown in FIG. 6, the bicycle structure 200 is a structure that is disposed under and supports the seat part 100 and allows a smooth, free change in the location of the stroller, and is a traveling means based on a three-wheeled bicycle having three wheels from which a handle 212 and a pedal 213 are removed.

In the bicycle structure 200, one front wheel 220 is installed under the front of the main frame 210 on which a saddle 211 is installed, and two rear wheels 230 are installed under the back of the main frame 210.

The saddle 211 installed on the main frame 210 is guided in a front-back direction along a guide groove formed in the longitudinal direction of the main frame 210, and may be fastened at a specific set location by a fastening means (not shown).

In particular, it is preferable that the saddle 211 is located on the front side of the main frame 210 when used for a stroller and is located on the rear side of the main frame 210 when used for a bicycle. By this configuration, the saddle 211 is not used while the bicycle structure 200 travels as a stroller, thereby reducing the risk of losing the saddle. It will be apparent that it is also possible to store the saddle 211 separately.

The front wheel 220 is installed under the front of the main frame 210, and may be steered and thus rotated by a support fork 222 configured to support the front axle 221.

The rear wheels 230 are installed under the back of the main frame 210, and may be rotated by the coupling between first ends of a pair of rear wheel connection frames 232 configured to support rear axles 231, respectively, and a pair of fastening frames 233 connected to the main frame 210.

In this case, the fastening frames 233 are configured such that first ends thereof are rotatably connected to the main frame 210 by hinges 236 and second ends thereof extend downward from both left and right sides of the main frame 210 and are fastened to first ends of the rear wheel connection frames 232 at corresponding locations.

Furthermore, a fastening shaft 234 is connected between the axes that are shared when the fastening frames 233 extending from both sides of the main frame 210 and the rear wheel connection frames 232 are coupled to each other.

The fastening shaft 234 is connected between the rear wheel connection frames 232 and the fastening frames 233, and functions to improve the support performance of the rear wheels 230 with respect to the ground. As described above, the fastening frames 233 fastened to the main frame 210 and the rear wheel connection frames 232 are coupled by the fastening shaft 234 in the state in which they share the shaft, thereby stably supporting the rear wheels 230 against the ground. In this case, the rear wheel connection frames 232 installed in a direction crossing the fastening frames 233 have some restrictions on rotation around the fastening shaft 234. In other words, the rear wheel connection frame 232 fastened to the rear axle 231 is not rotated upward around the fastening shaft 234, but is rotated only downward around the fastening shaft 234. This may improve the support performance of the rear wheels 230 with respect to the ground, and may also improve folding performance when the stroller is folded.

As shown in FIG. 4, a coupling means 250 configured to couple and fasten the connection frame part 130 to the rear end of the main frame 210 is installed on the bicycle structure 200.

The coupling means 250 is vertically fastened to the center portion of the top surface of the fastening shaft 234 and detachably coupled to the rear end of the main frame 210, and includes a coupling portion 251 configured to have a hollow and a fastening bar 252 configured to be inserted into the hollow of the coupling portion 251, to fasten the second connection frame 132 of the connection frame part 130, and to have a separate grip portion 253.

The coupling portion 251 includes two or more tubes having different sizes that are sequentially inserted and fastened such that the length of the coupling portion 251 can be adjusted as necessary when the coupling portion 251 and the fastening bar 252 are coupled to each other.

The above-described adjustment of length of the coupling portion 251 may be performed in such a manner that fastening means such as grooves and protrusions are formed on the coupling portion 251 or fastening bar 252 and the length is adjusted through the selective coupling of the fastening means.

Furthermore, the coupling portion 251 is configured to be selectively attached to and detached from the rear end of the main frame 210, and includes a sideways "U" shaped coupling element 254 provided at the rear end of the main frame 210 and an attachment portion 255 integrated with the upper end of the coupling portion 251 and configured to be selectively coupled to and separated from the coupling element 254 by the rotation of the fastening shaft 234.

The fastening bar 252 of the coupling means 250 is inserted into the through hole 132c provided in the lateral portion 132b of the second connection frame 132 of the connection frame part 130 and is fastened into the hollow of the coupling portion 251, thereby enabling the connection frame part 130 to be fastened to the bicycle structure 200.

Accordingly, the connection frame part 130 is fastened to the bicycle structure 200 in the state in which the seat 110 is also coupled thereto.

As shown in FIG. 3, protrusion portions 142 extending downward are installed on the rotation part 141 on both sides of the seat accommodation part 140, fastening portions 143 having fastening grooves 143a configured to receive the protrusion portions 142 are installed on the corresponding vertical portions 131a of the first connection frame 131, and the seat 110 is fastened to the connection frame part 130 in such a manner that the protrusion portions 142 are inserted into the fastening grooves 143a of the fastening portions 143.

Furthermore, as shown in FIG. 5, a coupling member 160 configured to be coupled to the front end of the main frame 210 of the bicycle structure 200 is installed on the lateral portion 131b located at the lower end of the first connection frame 131.

The coupling member 160 is formed in a hollow tube shape that is rotatably installed on the lateral portion of the first connection frame 131.

Furthermore, a protrusion portion 161 configured to be inserted and fastened into a groove portion 210a formed at the front end of the main frame 210 is integrated with the coupling member 160.

Accordingly, the protrusion portion 161 of the coupling member 160 provided on the first connection frame 131 is inserted and coupled into the groove portion 210a formed at the front end of the main frame 210 of the bicycle structure 200.

In addition, as shown in FIG. 4, in the state in which the through hole 132c of the second connection frame 132 is aligned with the hollow of the coupling portion 251, the fastening bar 252 provided with the grip portion 253 is sequentially inserted and coupled into the through hole 132c and the coupling portion 251.

Accordingly, the first connection frame 131 and second connection frame 132 of the connection frame part 130 are fastened to the front and rear ends of the main frame 210 of the bicycle structure 200, respectively, and thus the seat part 100 and connection frame part 130 of the stroller are securely fastened over the bicycle structure 200.

According to the stroller including the seat part 100, the connection frame part 130 and the bicycle structure 200, as shown in FIG. 7, in the state in which the front of the seat 110 is directed forward, the protrusion portions 142 inserted into the fastening portions 143 of the first connection frame 131 are separated in order to change the direction of the seat 110, the direction of the seat 110 is changed, and then the protrusion portions 142 are inserted into the opposite fastening portions 143, thereby changing the facing direction of the seat 110 from a forward direction to a rearward direction.

FIG. 8 is a view showing the folded state of the stroller according to the present invention. In the state in which the shade part 120 of the seat 110 is folded first, the angle of the seat part 100 is adjusted to be parallel to the first connection frame 131 of the connection frame part 130.

Thereafter, in the state in which the attachment portion 255 is separated and spaced apart from the coupling element 254 of the coupling means 250, when the upper end portion of the first connection frame 131 is lifted upward, the rear wheel connection frame 232 is located on the same line of the second connection frame 132 along with the rear wheel 230 while being rotated downward around the fastening shaft 234 of the bicycle structure 200.

At the same time, the connection shafts 133 together with the second connection frame 132 are rotated in a folding direction with respect to the first connection frame 131, and the main frame 210 rotatably coupled to the coupling member 169 of the first connection frame 131 is rotated, thereby allowing the overall stroller to be folded.

The front wheel 220 together with the rear wheels 230 maintains a substantially superposed state with one another.

Meanwhile, the stroller may be easily changed from the stroller to a bicycle by separating the connection frame part 130 on which the seat part 100 is mounted from the stroller as necessary, so that convenience in use may be achieved.

This allows the stroller to be changed to and used as a three-wheeled or two-wheeled bicycle without discarding the stroller when an infant who used the stroller grows up and needs to use a bicycle, thereby promoting resource conservation and reducing environmental pollution.

Figure 9:
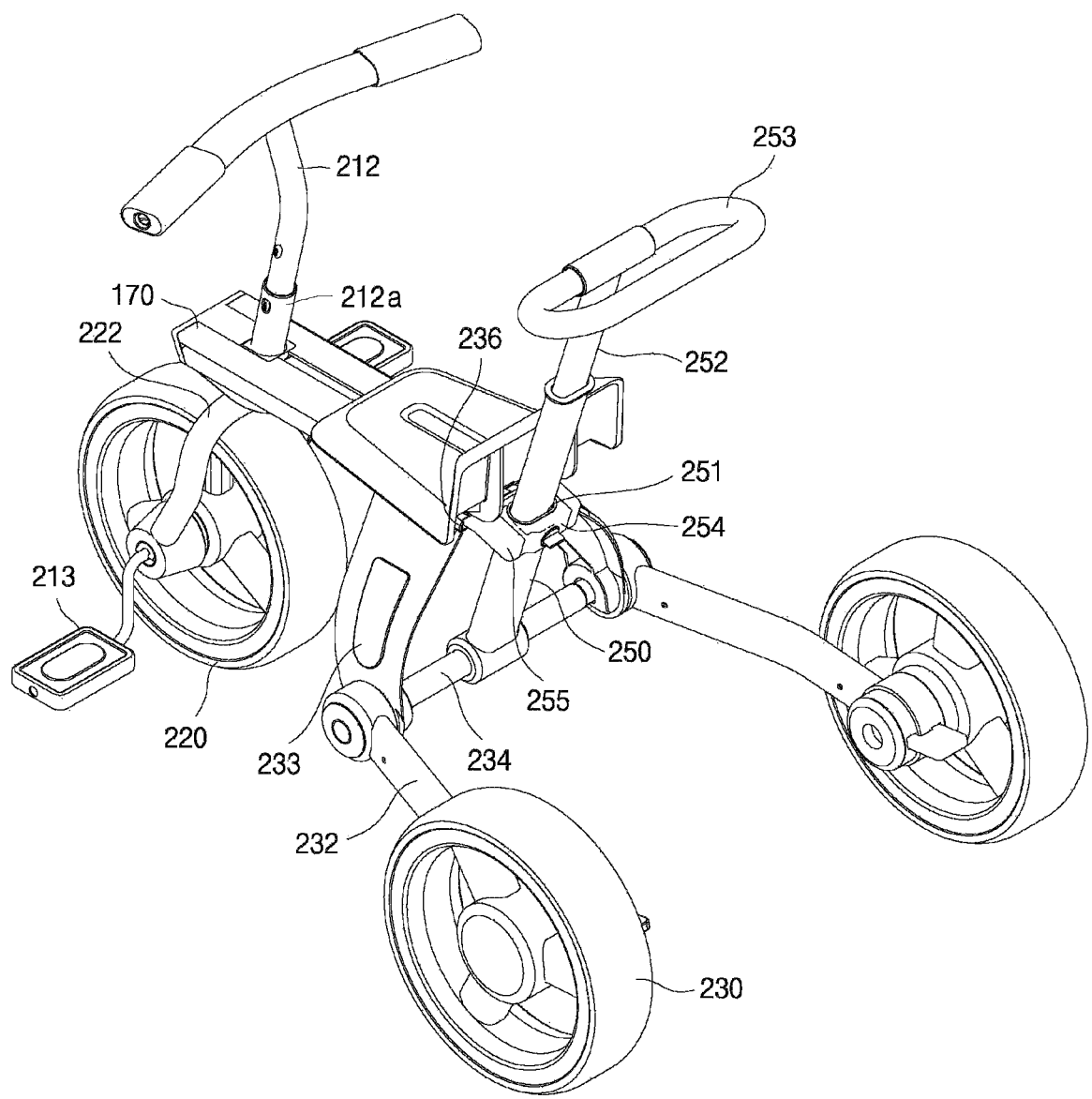
FIG. 9 is a perspective view showing a three-wheeled bicycle according to the present invention.
Figure 10:
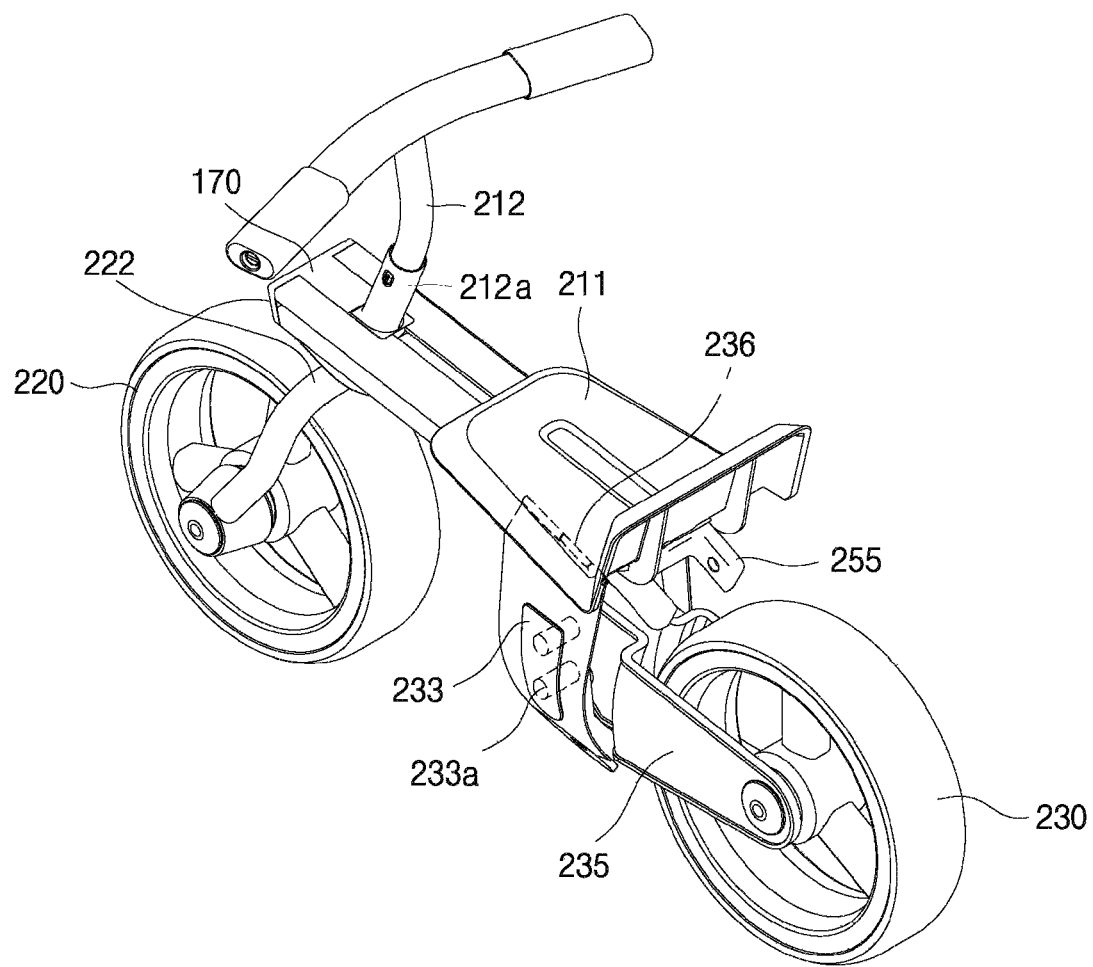
FIG. 10 is a perspective view showing a two-wheeled bicycle according to the present invention.

FIG. 9 is a perspective view showing a three-wheeled bicycle according to the present invention, and FIG. 10 is a perspective view showing a two-wheeled bicycle according to the present invention.

First, when it is necessary to change the stroller to a three-wheeled bicycle or to change the bicycle structure 200 to a three-wheeled bicycle, the state of the bicycle structure 200 is obtained by separating the connection frame part 130 on which the seat part 100 is mounted from the stroller.

As shown in FIG. 6, in the bicycle structure 200, in order to change to the three-wheeled bicycle of FIG. 9, the saddle 211 is located and fastened on the rear side with respect to the main frame 210.

The steering shaft 212a of the bicycle handle 212 is inserted vertically downward into the insertion hole 210b formed through the upper portion of the front side of the main frame 210, and is connected to the support fork 222 coupled to the front wheel 220 under the main frame 210. In this case, the groove portion 210b formed at the front end of the main frame 210 is blocked by a blocking member 170.

A pedal 213 is installed on the front wheel shaft 221 of the front wheel 220 so that the front wheel 220 can be driven.

Furthermore, the coupling portion 251 formed perpendicular to the top surface of the fastening shaft 234 provided on the bicycle structure 200 and coupled to the rear end of the main frame 210, and the fastening bar 252 inserted into the coupling portion 251 and provided with the grip portion 253 may be separated from the bicycle structure 200 and then used.

However, when an infant riding the three-wheeled bicycle rides the three-wheeled bicycle under the protection of a guardian, it is preferable that the coupling portion 251 and the fastening bar 252 are installed, the length of the coupling portion 251 is adjusted to extend the length, and the guardian controls the travel of the tricycle while gripping the grip portion 253.

Meanwhile, FIG. 10 is a view showing a state in which the three-wheeled bicycle of FIG. 9 is changed to a two-wheeled bicycle. In order to change the pair of rear wheels 230, provided under both the sides of the main frame 210, to one rear wheel 230, the fastening shaft 234 fastened between the fastening frames 233 is separated, and the one rear axle 231 cross-couples the rear wheel fastening frames 235 supporting on both the left and right sides in parallel between the fastening frames 233, so that it can be used as a two-wheeled bicycle.

At least one fastening hole (not shown) configured to be fastened by a fastening means 233a, such as a fastening pin, is formed in the fastening frame 233 and the rear wheel fastening frame 235.

Accordingly, the one rear wheel 230 may be stably supported against the ground by aligning the fastening hole formed in the fastening frame 233 and the rear wheel fastening frame 235 with each other and then applying the fastening means 233a.

Meanwhile, reference symbol 180 denotes a storage box that is selectively installed on the fastening shaft 234.

Although the preferred embodiments of the present invention have been described above, the present invention is not limited to the description of the above embodiments. Various modifications performed by a person having ordinary skill in the art to which the present invention pertains should also be interpreted as falling within the scope of protection of the present invention unless departing from the description of the claims of the present invention.

DESCRIPTION OF REFERENCE SYMBOLS

100: seat part 110: seat
120: shade part 130: connection frame part
131: first connection frame 132: second connection frame
133: connection shafts 140: seat accommodation part
150; footrest 160: coupling member
170: blocking member 180: storage box
200: bicycle structure 210: main frame
220: front wheel 221: front axle
222: support fork 230: rear wheel
231: rear axle 232: rear wheel connection frame
233: fastening frame 234: fastening shaft
235: rear wheel fastening frame 250: coupling means
251: coupling portion 252: fastening bar
253: grip portion 254: coupling element
255: attachment portion

The invention claimed is:

1. A stroller comprising:
a seat part including a seat, and a seat accommodation part configured to accommodate the seat;
a connection frame part including a first connection frame configured to support the seat on both sides thereof and to include vertical portions and lateral portions, and a second connection frame formed in a "U" shape including vertical portions and a lateral portion and configured such that the vertical portions are rotatably connected to the first connection frame; and
a bicycle structure including:
a main frame configured such that the connection frame part is mounted thereon in such a manner that the first connection frame is coupled to a front end thereof and the second connection frame is coupled to a rear end thereof and such that a saddle is installable thereon;
a front wheel installed under a front of the main frame; and
rear wheels installed under a back of the main frame.

2. The stroller of claim 1, wherein protrusion portions extending downward are installed on both sides of the seat accommodation part, fastening portions having fastening grooves configured to receive the protrusion portions are installed on the vertical portions of the first connection frame corresponding to the protrusion portions, and the seat accommodation part is formed to be selectively attached to and detached from the connection frame part.

3. The stroller of claim 1, wherein:
the front wheel is installed under the front of the main frame, and is formed to be steered and rotated by a support fork configured to support a front axle; and
the rear wheels are installed under the back of the main frame, and are formed to be rotated by coupling between first ends of a pair of rear wheel connection frames configured to support rear axles, respectively, and a pair of fastening frames connected to the main frame.

4. The stroller of claim 3, wherein:
first ends of the fastening frames are rotatably connected to the main frame by hinges;
second ends of the fastening frames extend downward from both left and right sides of the main frame and are fastened to first ends of rear wheel connection frames at corresponding locations; and
a fastening shaft is connected between axes that are shared when the fastening frames and the rear wheel connection frames are coupled to each other.

5. The stroller of claim 4, wherein a coupling means, including a coupling portion vertically fastened to the fastening shaft, detachably coupled to a rear end of the main frame, and configured to have a hollow, and a fastening bar configured to be inserted into the hollow of the coupling portion, to fasten the second connection frame of the connection frame part, and to have a separate grip portion, is installed in the main frame.

6. The stroller of claim 5, wherein the coupling portion includes:
a sideways "U" shaped coupling element provided at the rear end of the main frame; and
an attachment portion integrated with an upper end of the coupling portion, and configured to be selectively coupled to and separated from the coupling element by rotation of the fastening shaft.

7. The stroller of claim 6, wherein the coupling portion includes two or more tubes having different sizes that are sequentially inserted and fastened such that a length of the coupling portion is adjustable.

8. The stroller of claim 1, wherein:
a coupling member configured to be rotatably coupled to a front end of the main frame of the bicycle structure is installed on the lateral portion located at a lower end of the first connection frame; and
a through hole configured to allow a fastening bar to be inserted into a rear end of the main frame of the bicycle structure and to be fastened to a coupling portion is formed in the lateral portion of the second connection frame.

9. The stroller of claim 8, wherein the coupling member is formed in a hollow tube shape that is rotatably installed on the lateral portion of the first connection frame, and a protrusion portion configured to be inserted and fastened into a groove portion formed at the front end of the main frame is integrated with the coupling member.

10. The stroller of claim 1, wherein the bicycle structure constitutes a three-wheeled bicycle, including:
a front wheel installed under the front of the main frame, and formed to be steered and rotated by a support fork configured to support a front axle; and
a pair of rear wheels installed under the back of the main frame, and formed to be rotated by coupling between first ends of a pair of rear wheel connection frames configured to support rear axles, respectively, and a pair of fastening frames connected to the main frame.

11. The stroller of claim 10, wherein a coupling portion vertically fastened to a fastening shaft formed between axes that are shared when the fastening frames and the rear wheel connection frames are coupled to each other, detachably coupled to a rear end of the main frame, and configured to have a hollow and a fastening bar configured to be inserted into the hollow of the coupling portion, to fasten the second connection frame of the connection frame part and to have a separate grip portion are installed.

12. The stroller of claim 1, wherein the bicycle structure constitutes a two-wheeled bicycle, including:
a front wheel installed under the front of the main frame, and formed to be steered and rotated by a support fork configured to support a front axle; and
a rear wheel installed under the back of the main frame, configured to be supported on both the left and right sides in parallel by rear wheel fastening frames cross-coupled between the fastening frames configured such that the first ends thereof are connected to the main frame by hinges and the second ends thereof extend downward from both the left and right sides of the main frame, and formed to be rotated.

* * * * *